US011491560B1

United States Patent
Park et al.

(10) Patent No.: US 11,491,560 B1
(45) Date of Patent: Nov. 8, 2022

(54) CUTTING INSERT AND ROTARY CUTTING TOOL INCLUDING SAME

(71) Applicant: TAEGUTEC LTD., Daegu (KR)

(72) Inventors: Chang Gyu Park, Daegu (KR); Kang Sool Jung, Daegu (KR); Dong Hyun Kim, Daegu (KR)

(73) Assignee: TaeguTec Ltd., Dalseong-gun (KR)

( * ) Notice: Subject to any disclaimer, the term of this patent is extended or adjusted under 35 U.S.C. 154(b) by 0 days.

(21) Appl. No.: 17/374,501

(22) Filed: Jul. 13, 2021

(51) Int. Cl.
*B23C 5/02* (2006.01)
*B23C 5/22* (2006.01)
*B23C 5/10* (2006.01)

(52) U.S. Cl.
CPC .......... *B23C 5/2213* (2013.01); *B23C 5/1009* (2013.01); *B23C 2210/04* (2013.01); *B23C 2210/40* (2013.01)

(58) Field of Classification Search
CPC ......... Y10T 407/1932; Y10T 407/1936; Y10T 407/1938; Y10T 407/22; Y10T 407/227; Y10T 407/2274; Y10T 407/23; Y10T 407/228; Y10T 407/195; Y10T 407/1934; Y10T 407/1906; B23C 5/2468; B23C 5/2465; B23C 5/2213; B23C 5/1009; B23C 2200/161; B23C 2210/04; B23C 2210/40
See application file for complete search history.

(56) References Cited

U.S. PATENT DOCUMENTS

| | | | |
|---|---|---|---|
| 5,542,795 A * | 8/1996 | Mitchell | B23C 5/2213 407/42 |
| 5,951,213 A | 9/1999 | Fauser et al. | |
| 6,536,996 B2 | 3/2003 | Satran et al. | |
| 6,921,233 B2 | 7/2005 | Duerr et al. | |
| 9,114,460 B2 | 8/2015 | Nisikawa | |
| 9,283,631 B2 * | 3/2016 | Sjöö | B23F 21/166 |
| 9,573,204 B2 | 2/2017 | Hecht | |
| 9,682,433 B2 * | 6/2017 | Choi | B23C 5/2213 |
| 10,350,687 B2 * | 7/2019 | Kumoi | B23C 5/20 |
| 2002/0037199 A1 * | 3/2002 | Satran | B23C 5/1045 407/54 |

(Continued)

FOREIGN PATENT DOCUMENTS

JP  2014-83632  5/2014

OTHER PUBLICATIONS

International Search Report dated Sep. 21, 2022, issued in PCT counterpart application (No. PCT/KR2022/008699).

*Primary Examiner* — Nicole N Ramos
(74) *Attorney, Agent, or Firm* — Womble Bond Dickinson (US) LLP (57) ABSTRACT

A cutting insert includes an upper surface, a lower surface opposite to the upper surface, a first side surface and a second side surface configured to connect the upper surface and the lower surface, a mounting hole formed to penetrate the upper surface and the lower surface, a first cutting edge formed at an edge of the upper surface that meets the first side surface, and a second cutting edge formed at an edge of the upper surface that meets the second side surface. The lower surface includes a ridge portion, and a first inclined surface and a second inclined surface positioned on both sides of the ridge portion as a boundary. When looking at the lower surface, the first inclined surface and the second inclined surface have asymmetric shapes with respect to the ridge portion.

20 Claims, 9 Drawing Sheets

(56) References Cited

U.S. PATENT DOCUMENTS

| | | | |
|---|---|---|---|
| 2003/0017014 A1* | 1/2003 | Morgulis | B23C 5/109 |
| | | | 407/34 |
| 2006/0056926 A1 | 3/2006 | Riviere et al. | |
| 2006/0216121 A1* | 9/2006 | Edler | B23B 27/1611 |
| | | | 407/104 |
| 2009/0311057 A1* | 12/2009 | Yoshida | B23C 5/2247 |
| | | | 407/113 |
| 2012/0051851 A1 | 3/2012 | Saito et al. | |
| 2013/0129431 A1* | 5/2013 | Filho | B23C 5/109 |
| | | | 407/102 |
| 2013/0136547 A1 | 5/2013 | Kurokawa et al. | |
| 2013/0330136 A1* | 12/2013 | Hecht | B23C 5/2269 |
| | | | 407/113 |
| 2019/0283151 A1 | 9/2019 | Jansson | |

* cited by examiner

CUTTING INSERT AND ROTARY CUTTING TOOL INCLUDING SAME

TECHNICAL FIELD

The present disclosure relates to a rotary cutting tool used for milling a workpiece. The present disclosure also pertains to a cutting insert mounted on such a rotary cutting tool.

BACKGROUND

An end mill (also referred to as an 'end milling cutter') is known as an example of a rotary cutting tool used for milling. Unlike a drill used only for perforation, the end mill has cutting edges on its periphery and tip, and may be used for groove cutting, side cutting and the like of a workpiece. Among end mills, the ball nose end mills having a round front end are divided into a solid ball nose end mill in which an end mill body and a ball nose are integrally formed and an indexable ball nose end mill in which a cutting insert is replaceably mounted on an end mill body (or a tool body), depending on whether the cutting insert is mounted.

In the indexable ball nose end mill, the cutting insert is usually coupled to the tool body by a screw. The screw provides only a fastening force in a direction perpendicular to the cutting insert (e.g., a direction in which the cutting insert is pressed against the tool body as the screw is tightened). As such, the screw does not sufficiently support the reaction force generated by the cutting force. In particular, the cutting insert used in the ball nose end mill has an arc-shaped edge for curved surface cutting. Accordingly, if the cutting insert is fixed to the tool body only with a screw, then the cutting insert rotates around the screw due to the reaction force generated by the cutting force during machining. This leads to a problem wherein the cutting insert cannot be firmly fixed to the tool body. That is, there is a problem in that the deformation of the screw or the breakage of the cutting insert may be caused.

To solve such conventional problems, there is disclosed a ball nose end mill in which a cutting insert and a mounting structure of an insert pocket provided in a tool body are changed. According to such ball nose end mill, a concave groove is formed on the lower surface of the cutting insert, and a protrusion having a shape corresponding to the concave groove is formed on the bottom surface of the insert pocket on which the cutting insert is seated. The cutting insert is fixed in a direction perpendicular to the insert pocket by a screw, and is firmly fixed so that its rotation on the insert pocket is prevented by the engagement between the protrusion and the concave groove. However, in the case of the ball nose end mill having such mounting structure, an additional manufacturing process is required to form the protrusion on the bottom surface of the insert pocket, and a grinding process is additionally required to precisely machine the concave groove on the lower surface of the cutting insert. This may result in an increase in the manufacturing cost of the cutting insert. Moreover, the cutting vibration or cutting force is concentrated to these coupling portions in a state in which the protrusion is coupled to the concave groove. As such, there are drawbacks since the fatigue increases and the cutting insert is likely to be damaged.

SUMMARY

Various embodiments of the present disclosure provide a cutting insert having a ridge portion formed on a lower surface thereof so that the ridge portion can be stably fastened to a tool body of a rotary cutting tool. Furthermore, various embodiments of the present disclosure provide a cutting insert having both a center edge and a peripheral edge. In addition, various embodiments of the present disclosure provide a rotary cutting tool including such a cutting insert.

One aspect of the present disclosure is directed to a cutting insert. The cutting insert according to an exemplary embodiment includes: an upper surface; a lower surface opposite to the upper surface; a first side surface and a second side surface configured to connect the upper surface and the lower surface; a mounting hole formed to penetrate the upper surface and the lower surface; a first cutting edge formed at an edge of the upper surface that meets the first side surface; a second cutting edge formed at an edge of the upper surface that meets the second side surface; and a first corner portion and a second corner portion provided at both ends of the upper surface where the first side surface and the second side surface meet. The lower surface includes a ridge portion, and a first inclined surface and a second inclined surface positioned on both sides of the ridge portion as a boundary, and when looking at the lower surface, the first inclined surface and the second inclined surface have asymmetric shapes with respect to the ridge portion.

In one embodiment, the first cutting edge may include a peripheral edge extending in a curved shape from the first corner portion and a long edge connected to the peripheral edge and extending to the second corner portion, the second cutting edge may include a center edge extending in a curved shape from the second corner portion and a short edge connected to the center edge and extending to the first corner portion, and a straight-line distance between both ends of the long edge may be longer than a straight-line distance between both ends of the short edge.

In one embodiment, each of the long edge and the short edge may have a straight line shape.

In one embodiment, when looking at the lower surface, the ridge portion may be spaced apart from the second corner portion and may be formed so as to be inclined with respect to a virtual line that connects a point where the peripheral edge and the long edge meet and the second corner portion, the ridge portion extending across the mounting hole.

In one embodiment, when looking at the lower surface, the ridge portion may be formed to extend from an edge of the lower surface adjacent to the long edge to an edge of the lower surface adjacent to the short edge.

In one embodiment, the ridge portion may be formed in a planar shape to have a set width between the first inclined surface and the second inclined surface.

In one embodiment, the ridge portion may be formed in a shape of a line where the first inclined surface and the second inclined surface meet.

In one embodiment, each of the first inclined surface and the second inclined surface may be formed to be inclined upward as a distance from the ridge portion increases.

In one embodiment, each of the first inclined surface and the second inclined surface may be inclined at an inclination angle within a range of 5 degrees to 30 degrees with respect to a reference line perpendicular to a center axis line passing through a center of the mounting hole and extending in an extension direction of the mounting hole.

In one embodiment, the upper surface may include a center surface on which the mounting hole is formed, a land surface formed along the first cutting edge and the second cutting edge, and a rake surface formed between the center surface and the land surface, and when the cutting insert is viewed from a lateral side, each of the first corner portion and the second corner portion may be raised more than the center surface.

Another aspect of the present disclosure is directed to a rotary cutting tool for milling a workpiece. The rotary cutting tool according to an exemplary embodiment includes: a cylindrical tool body having two rows of helical flutes formed at a longitudinal front end portion thereof; a pair of cutting inserts replaceably mounted on the tool body; and a pair of screws configured to respectively fix the pair of cutting inserts to the tool body. Each of the pair of cutting inserts includes: an upper surface; a lower surface opposite to the upper surface and including a ridge portion, and a first inclined surface and a second inclined surface positioned on both sides of the ridge portion as a boundary and having asymmetric shapes with respect to the ridge portion; a first side surface and a second side surface configured to connect the upper surface and the lower surface; a mounting hole formed to penetrate the upper surface and the lower surface so that each of the pair of screws is fitted to the mounting hole; a first corner portion and a second corner portion provided at both ends of the upper surface where the first side surface and the second side surface meet; a first cutting edge formed between the first side surface and the upper surface and including a peripheral edge extending in a curved shape from the first corner portion; and a second cutting edge formed between the second side surface and the upper surface and including a center edge extending in a curved shape from the second corner portion, a first insert pocket and a second insert pocket for accommodating the pair of cutting inserts are formed in the two rows of helical flutes, respectively. The pair of cutting inserts includes a first cutting insert mounted on the first insert pocket such that the first corner portion is positioned in a forward axial direction in which a front end of the tool body is oriented, whereby the peripheral edge of the first cutting insert is positioned in a radially outward direction and the forward axial direction of the tool body with respect to the center edge, and the pair of cutting inserts includes a second cutting insert mounted on the second insert pocket such that the second corner portion is positioned in the forward axial direction, whereby the center edge of the second cutting insert is positioned in the radially outward direction and the forward axial direction of the tool body with respect to the peripheral edge.

In one embodiment, the lower surface of the first cutting insert may have a V-shape when the first cutting insert is viewed from a lateral side. The first insert pocket may include a first bottom surface configured to support the V-shaped lower surface of the first cutting insert and a first side wall extending in the radially outward direction of the tool body from the inside of the first bottom surface and configured to support the second side surface of the first cutting insert. Further, the lower of the second cutting insert may have a V-shape when the second cutting insert is viewed from a lateral side. The second insert pocket may include a second bottom surface configured to support the V-shaped lower surface of the second cutting insert and a second side wall extending in the radially outward direction of the tool body from the inside of the second bottom surface and configured to support the first side surface of the second cutting insert.

In one embodiment, the first bottom surface may include a first outer bottom surface making contact with the first inclined surface adjacent to the peripheral edge of the first cutting insert, a first inner bottom surface making contact with the second inclined surface adjacent to the center edge of the first cutting insert, and a first ridge receiving groove formed between the first outer bottom surface and the first inner bottom surface and configured to receive the ridge portion of the first cutting insert. Further, the second bottom surface may include a second inner bottom surface making contact with the first inclined surface adjacent to the peripheral edge of the second cutting insert, a second outer bottom surface making contact with the second inclined surface adjacent to the center edge of the second cutting insert, and a second ridge receiving groove formed between the second inner bottom surface and the second outer bottom surface and configured to receive the ridge portion of the second cutting insert.

In one embodiment, the rotary cutting tool may be a ball nose end mill.

BRIEF DESCRIPTION OF DRAWINGS

The accompanying drawings, which are incorporated in and constitute a part of the specification, illustrate embodiments of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

The directional term "upward," "upper," etc., used herein is based on a direction in which an upper face is positioned with respect to a lower face in the accompanying drawings. The directional term "downward," "lower," etc., means a direction opposite to the upward or upper direction. A cutting insert shown in the accompanying drawings may be otherwise oriented and the above-described directional terms may be interpreted accordingly.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Figure 1:
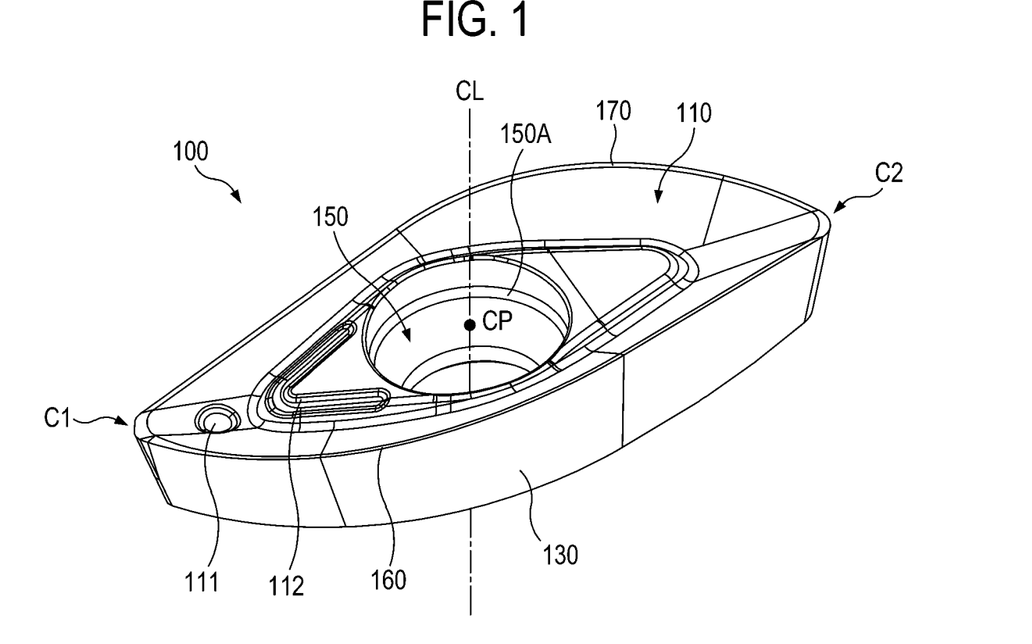
FIG. 1 is a perspective view showing a cutting insert according to one embodiment of the present disclosure.
Figure 2:
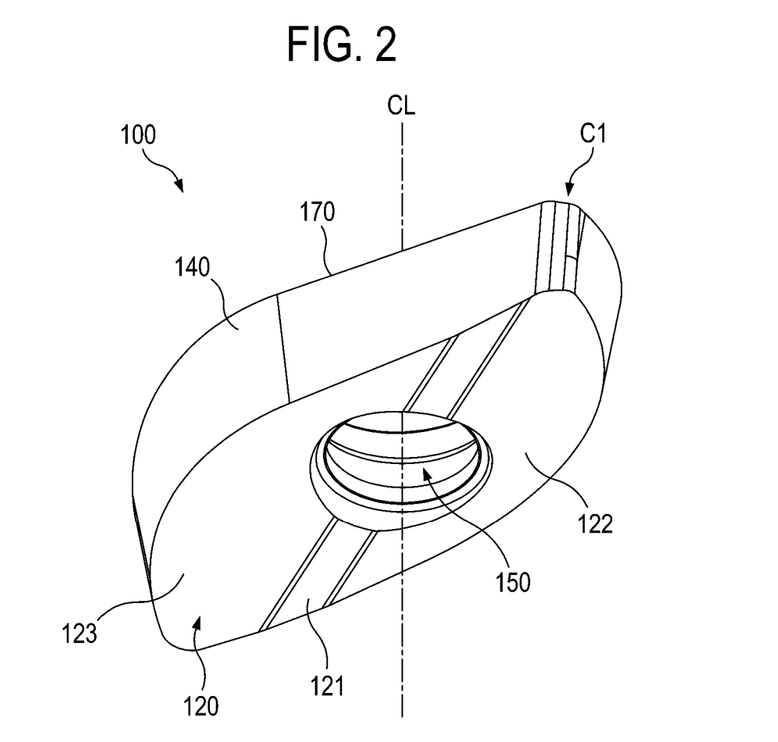
FIG. 2 is a perspective view of the cutting insert shown in FIG. 1, which is viewed from another direction.

FIG. 1 is a perspective view showing a cutting insert 100 according to one embodiment of the present disclosure. FIG. 2 is a perspective view of the cutting insert 100 shown in FIG. 1, which is viewed from another direction.

Referring to FIGS. 1 and 2, the cutting insert 100 according to one embodiment has an upper surface 110, a lower surface 120 opposite to the upper surface 110, and a plurality of side surfaces connecting the upper surface 110 and the lower surface 120. A cutting edge is provided at the edge of the upper surface 110 that meets the plurality of side surfaces. Such a cutting insert 100 may be referred to as a single-sided cutting insert.

In one embodiment, the cutting insert 100 has a first side surface 130 and a second side surface 140 as the plurality of side surfaces. A portion of each of the first side surface 130 and the second side surface 140 may be a curved surface and the other portion thereof may be a flat surface. However, the present disclosure is not limited thereto. Depending on the shape of the cutting edge, the entirety of each of the first side surface 130 and the second side surface 140 may be a curved surface.

A mounting hole 150 is formed in the cutting insert 100 so as to pass through the upper surface 110 and the lower surface 120 so that the cutting insert 100 can be mounted on the rotary cutting tool. A step portion 150A on which the head of the screw can be caught is formed in the mounting hole 150 so that when the screw inserted into the mounting hole 150 is tightened, the cutting insert 100 is pushed toward and pressed against the tool body of the rotary cutting tool.

The cutting insert 100 has a first cutting edge 160 formed at an edge of the upper surface 110 that meets the first side surface 130. Furthermore, the cutting insert 100 has a second cutting edge 170 formed at an edge of the upper surface 110 that meets the second side surface 140. The first cutting edge 160 and the second cutting edge 170 of the cutting insert 100 have different shapes with respect to the central axis CL passing through the center CP of the mounting hole 150 and extending in the extension direction of the mounting hole 150. That is, the cutting insert 100 according to one embodiment may be mounted on the rotary cutting tool to use the first cutting edge 160, or may be mounted on the rotary cutting tool to use the second cutting edge 170. That is, all the cutting edges provided in the cutting insert 100 can be used, which makes it possible to economically use the cutting insert 100.

As shown in FIGS. 1 and 2, the upper surface 110 of the cutting insert 100 has a shape similar to an oval shape. The upper surface 110 includes a first corner portion C1 and a second corner portion C2 at both ends thereof where the first side surface 130 and the second side surface 140 meet each other. On the upper surface 110 of the cutting insert 100, mark portions 111 and 112 having various shapes may be formed such as grooves or protrusions so that the mounting direction of the cutting insert 100 can be easily checked with the naked eye when the cutting insert 100 is mounted on the rotary cutting tool. The first corner portion C1 is located relatively closer to the mark portions 111 and 112 than the second corner portion C2.

The cutting insert 100 according to one embodiment has a V-shaped lower surface 120 so that the mounting of the cutting insert 100 on the rotary cutting tool can be stably maintained even when the cutting insert 100 receives a radial component force (principal force), a feed direction component force (thrust force) and an axial component force (axial force) generated during the machining of a workpiece (e.g., end milling). That is, the lower surface 120 includes a ridge portion 121 and a first inclined surface 122 and a second inclined surface 123 respectively positioned on both sides of the ridge portion 121 as a boundary. The ridge portion 121 is formed to cross between the edge of the lower surface 120 corresponding to the first cutting edge 160 and the edge of the lower surface 120 corresponding to the second cutting edge 170.

The first inclined surface 122 and the second inclined surface 123 of the lower surface 120 have an asymmetric shape with respect to the ridge portion 121, which makes it possible to prevent the cutting insert 100 from being incorrectly mounted to the rotary cutting tool. In this regard, description will be made again when describing the rotary cutting tool later. Thus, the lower surface 120 lacks 180° rotational symmetry about the central axis CL. Furthermore, the first inclined surface 122 and the second inclined surface 123 lack 180° rotational symmetry with respect to one other about the central axis CL.

Further, in the cutting insert 100, each of the first side surface 130 and the second side surface 140 may be inclined to have a positive relief angle with respect to the upper surface 110 in order to improve the cutting force.

Figure 3:
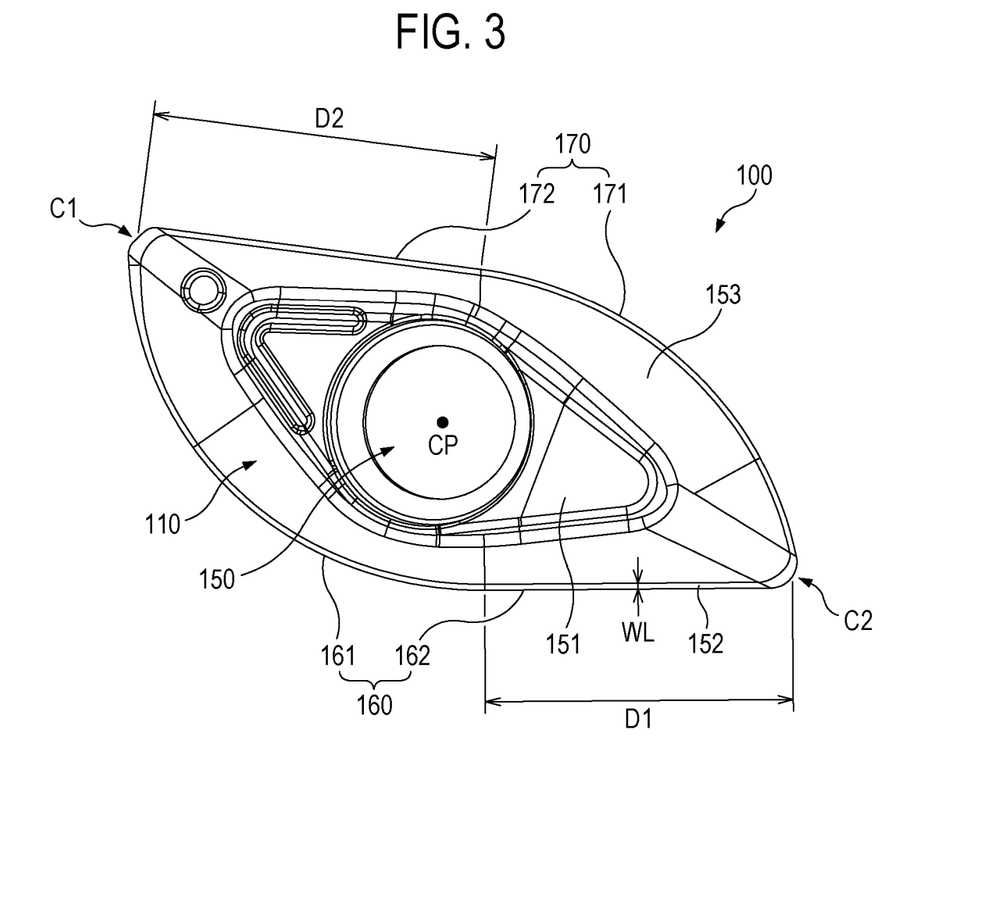
FIG. 3 is a plan view of a cutting insert according to one embodiment of the present disclosure.
Figure 4:
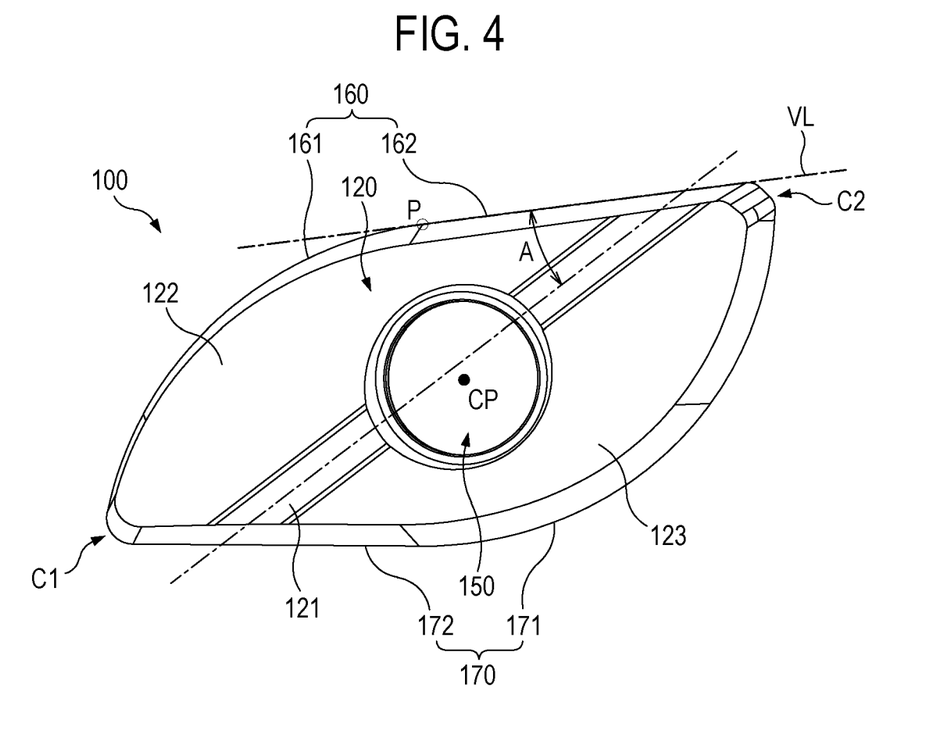
FIG. 4 is a bottom view of the cutting insert according to one embodiment of the present disclosure.

FIG. 3 is a plan view of the cutting insert 100 according to one embodiment of the present disclosure. FIG. 4 is a bottom view of the cutting insert 100 according to one embodiment of the present disclosure.

As shown in FIG. 3, the upper surface 110 of the cutting insert 100 includes a center surface 151 on which a mounting hole 150 is formed in its central portion. Moreover, the upper surface 110 includes a land surface 152 formed along the first cutting edge 160 and the second cutting edge 170. The land surface 152 may be formed as a negative land surface having a set width WL. The land surface 152 prevents the cutting insert from being damaged at the initial stage of cutting a workpiece, and maintains the strength of the cutting edge. The upper surface 110 includes a rake surface 153 formed between the center surface 151 and the land surface 152. In the cutting insert 100, the first corner portion C1 and the second corner portion C2 are formed to protrude more than the center surface 151 (see FIGS. 5 and 6). The rake surface 153 is formed to include a curved surface. Chips generated during the cutting of a workpiece may be guided and smoothly discharged along the rake surface 153.

Referring to FIGS. 3 and 4, the first cutting edge 160 includes a peripheral edge 161 extending in a curved shape from the first corner portion C1 and a long edge 162 connected to the peripheral edge 161 and extending to the second corner portion C2. Furthermore, the second cutting edge 170 includes a center edge 171 extending in a curved shape from the second corner portion C2 and a short edge 172 connected to the center edge 171 and extending to the first corner portion C1.

In one embodiment, the straight-line distance D1 between both ends of the long edge 162 is greater than the straight-line distance D2 between both ends of the short edge 172. In this regard, the straight-line distance D1 between both ends of the long edge 162 refers to the straight-line distance between one end of the long edge 162 meeting the peripheral edge 161 and the other end of the long edge 162 extending to the second corner portion C2, and the straight-line distance D2 between both ends of the short edge 172 refers to the straight-line distance between one end of the short edge 172 meeting the center edge 171 and the other end of the short edge 172 extending to the first corner portion C1. Thus, the upper surface 110 of the cutting insert 100 lacks 180° rotational symmetry about the central axis CL. Furthermore, the first and send cutting edges 160, 170 lack 180° rotational symmetry relative to one another, about the central axis CL.

In one embodiment, each of the long edge 162 and the short edge 172 has a straight line shape. However, the present disclosure is not limited thereto. The long edge 162 and the short edge 172 may be modified in various shapes including a curved shape.

When looking at the lower surface 120 as shown in FIG. 4, the lower surface 120 is divided into a first inclined surface 122 and a second inclined surface 123 by a ridge portion 121. The ridge portion 121 is formed so that the first inclined surface 122 and the second inclined surface 123 have asymmetric shapes, i.e., such that the first inclined surface 122 and the second inclined surface 123 are different in area and shape. In one embodiment, the ridge portion 121 is spaced apart from the second corner portion C2 and is formed so as to be inclined with respect to the virtual line VL that connects a point P where the peripheral edge 161 and the long edge 162 meet and the second corner portion C2. The ridge portion 121 is formed to cross the mounting hole 150. When the long edge 162 has a straight line as in one embodiment, the virtual line VL may be formed to extend on the long edge 162.

Further, in one embodiment, the ridge portion 121 is formed to extend from an edge of the lower surface 120 adjacent to the long edge 162 to an edge of the lower surface 120 adjacent to the short edge 172. In the cutting insert 100, the lower surface 120 has a shape similar to an oval shape having two corner portions (i.e., the first corner portion C1 and the second corner portion C2) like the upper surface 110. In this regard, for example, the edge of the lower surface 120 adjacent to the long edge 162 on the upper surface 110 may mean an edge of the lower surface 120 positioned below the long edge 162 as in the orientation of the cutting insert 100 shown in FIG. 1. If the ridge portion 121 extending from the edge of the lower surface 120 adjacent to the long edge 162 extends toward an edge of the lower surface 120 adjacent to the peripheral edge 161 or an edge of the lower surface 120 adjacent to the center edge 172, the first inclined surface 122 and the second inclined surface 123 cannot be formed to have an equal size (e.g., the size of an area of a portion in contact with the rotary cutting tool when mounted on the rotary cutting tool). In addition, since the cutting insert 100 is mounted on the rotary cutting tool so that the first corner portion C1 or the second corner portion C2 face the front axial direction in the front end of the rotary cutting tool (see FIGS. 9 and 10), when the ridge portion 121 is formed to extend between the edge of the lower surface 120 adjacent to the peripheral edge 161 and the edge of the lower surface 120 adjacent to the center edge 171, even if the lower surface 120 of the cutting insert 100 is formed in a V shape, it is difficult to stably support the axial component force among the cutting forces generated during machining of the workpiece. As such, cutting vibration may occur, which may reduce the machining quality of the workpiece. Moreover, it may cause problems such as breakage or drop-off the cutting insert 100, thereby reducing tool life and lowering machining productivity.

By forming the ridge portion 121 to extend from the edge of the lower surface 120 spaced apart from the second corner portion C2 and forming the ridge portion 121 to be inclined with respect to the virtual line VL as described above, the two inclined surfaces (the first inclined surface 122 and the second inclined surface 123) of the lower surface 120 can be distributed as equally as possible. Accordingly, a sufficient support surface (e.g., the area of the portion brought into contact with and supported by the rotary cutting tool) can be provided both when the cutting insert 100 is mounted on the rotary cutting tool to use the first cutting edge 160 and when the cutting insert 100 is mounted on the rotary cutting tool to use the second cutting edge 170. This makes it possible to firmly and stably mount the cutting insert 100. Moreover, by allowing the first inclined surface 122 and the second inclined surface 123 divided by the ridge portion 121 to have asymmetric shapes, it is possible to prevent the erroneous mounting of the cutting insert 100 on the rotary cutting tool. That is, it is possible to efficiently perform the mounting of the cutting insert 100 on the rotary cutting tool.

The angle A at which the ridge portion 121 is inclined with respect to the virtual line VL may be set to fall in a range in which the areas of both inclined surfaces (the first inclined surface 122 and the second inclined surface 123) can be distributed as evenly as possible as long as error proof is possible.

Figure 5:
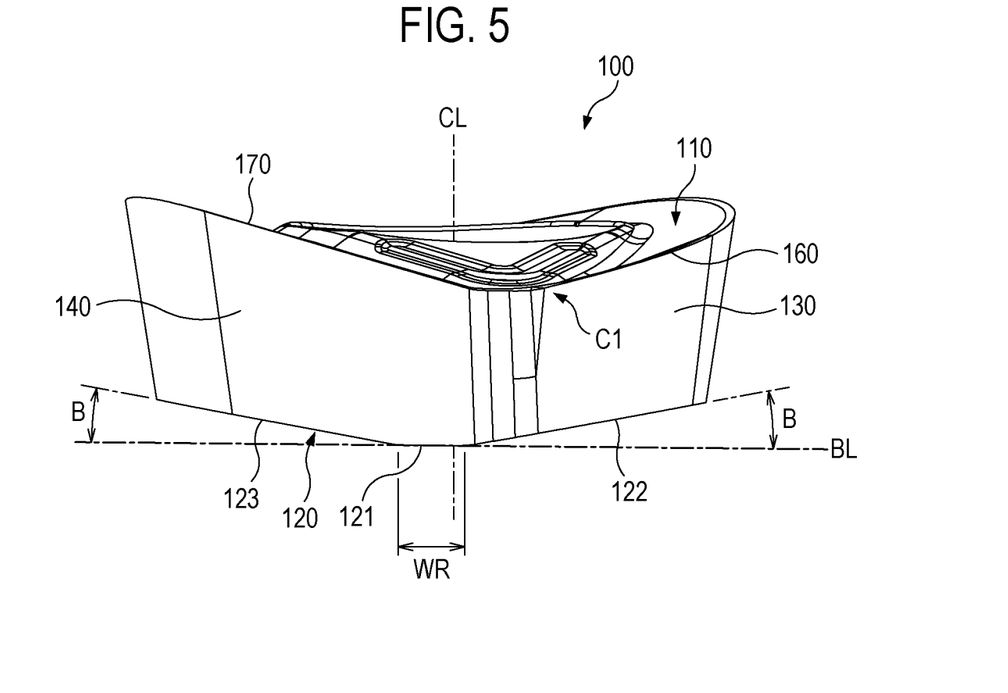
FIG. 5 is a side view of the cutting insert according to one embodiment of the present disclosure.
Figure 6:
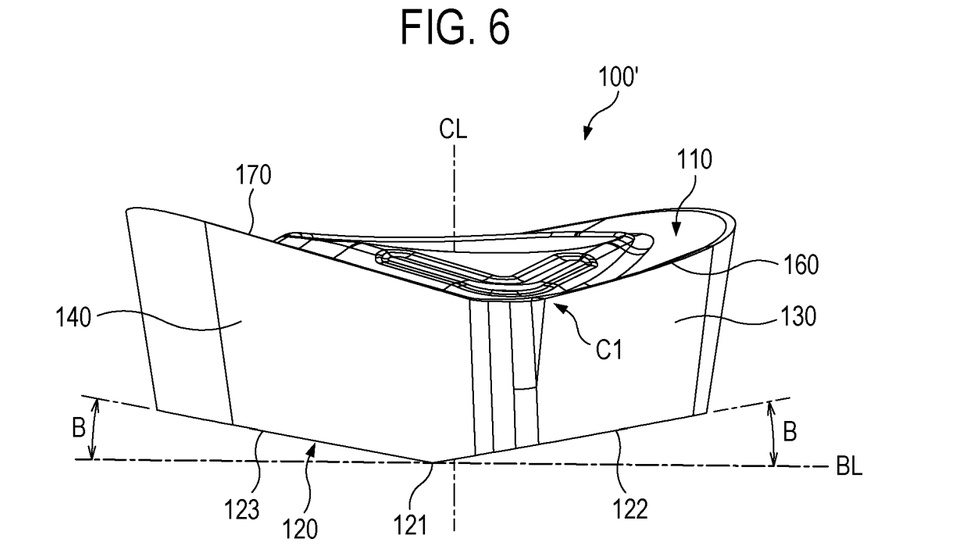
FIG. 6 is a side view of a cutting insert according to another embodiment of the present disclosure.

FIG. 5 is a side view of the cutting insert 100 according to one embodiment of the present disclosure. FIG. 6 is a side view of a cutting insert 100' according to another embodiment of the present disclosure.

Referring to FIGS. 5 and 6, the ridge portion 121 may be formed in a planar shape having a set width WR between the first inclined surface 122 and the second inclined surface 123 (see FIG. 5). However, the shape of the ridge portion 121 is not limited thereto. The ridge portion 121 may also be formed in a linear shape just like a boundary line where the first inclined surface 122 and the second inclined surface 123 meet (see FIG. 6).

As shown in FIGS. 5 and 6, when the cutting inserts 100 and 100' are viewed approximately from the direction facing the first corner portion C1, the first inclined surface 122 and the second inclined surface 123 are formed to be inclined upward as they extend away from the ridge portion 121. That is, each of the cutting inserts 100 and 100' has a lower surface 120 having a V shape or a similar shape.

Each of the first inclined surface 122 and the second inclined surface 123 is inclined at an inclination angle B within a range of 5 degrees to 30 degrees with respect to the reference line BL perpendicular to the center axis line CL extending in the extension direction of the mounting hole 150. In one embodiment, each of the first inclined surface 122 and the second inclined surface 123 has an inclination angle B of 10 degrees with respect to the reference line BL. If the inclination angle B is less than 5 degrees, the lower surface 120 has a shape close to a flat surface. As such, the radial component force (principal force), the feed direction component force (thrust force) and the axial component force (axial force) generated during the machining of a workpiece are difficult to be effectively supported by the insert pocket of the tool body on which the cutting insert 100 is mounted. If the inclination angle B exceeds 30 degrees, a deep groove has to be formed in the insert pocket of the tool body on which the cutting insert 100 is mounted. Accordingly, the rigidity of the tool body itself becomes structurally weak.

Hereinafter, the rotary cutting tool on which the cutting insert according to the above-described embodiment is replaceably mounted will be described. In the following description, the content overlapping with the description of the above-described cutting insert 100 will be briefly mentioned or omitted.

Figure 7:
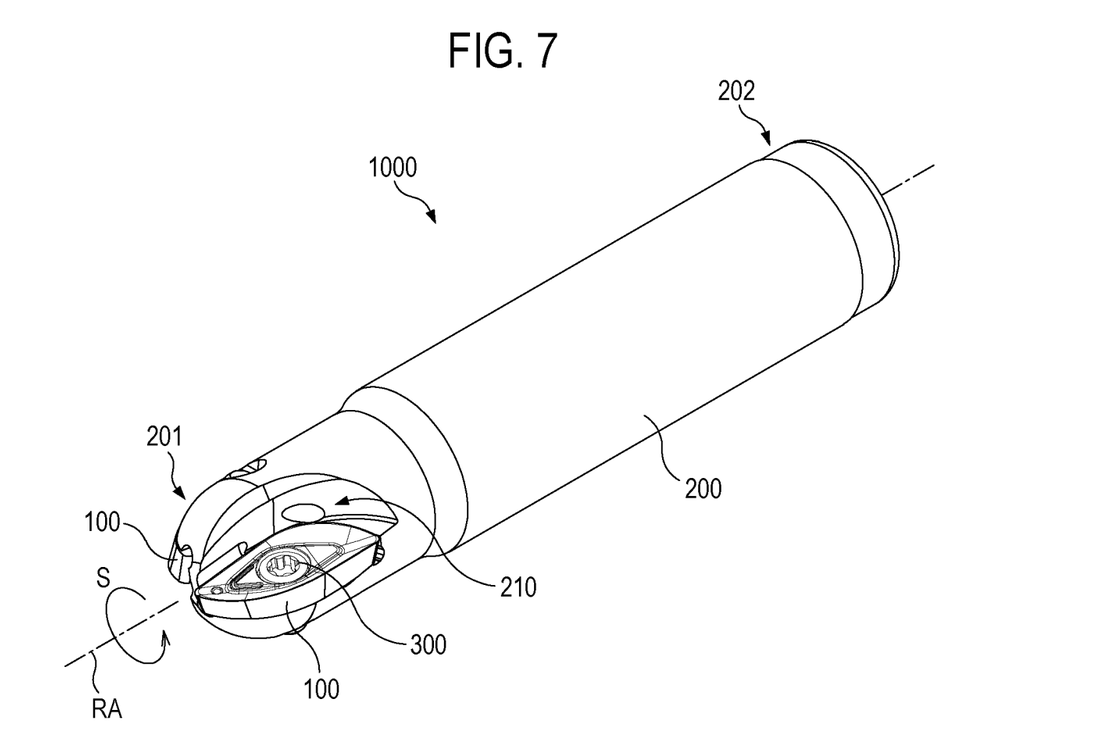
FIG. 7 is a perspective view showing a rotary cutting tool according to one embodiment of the present disclosure.
Figure 8:
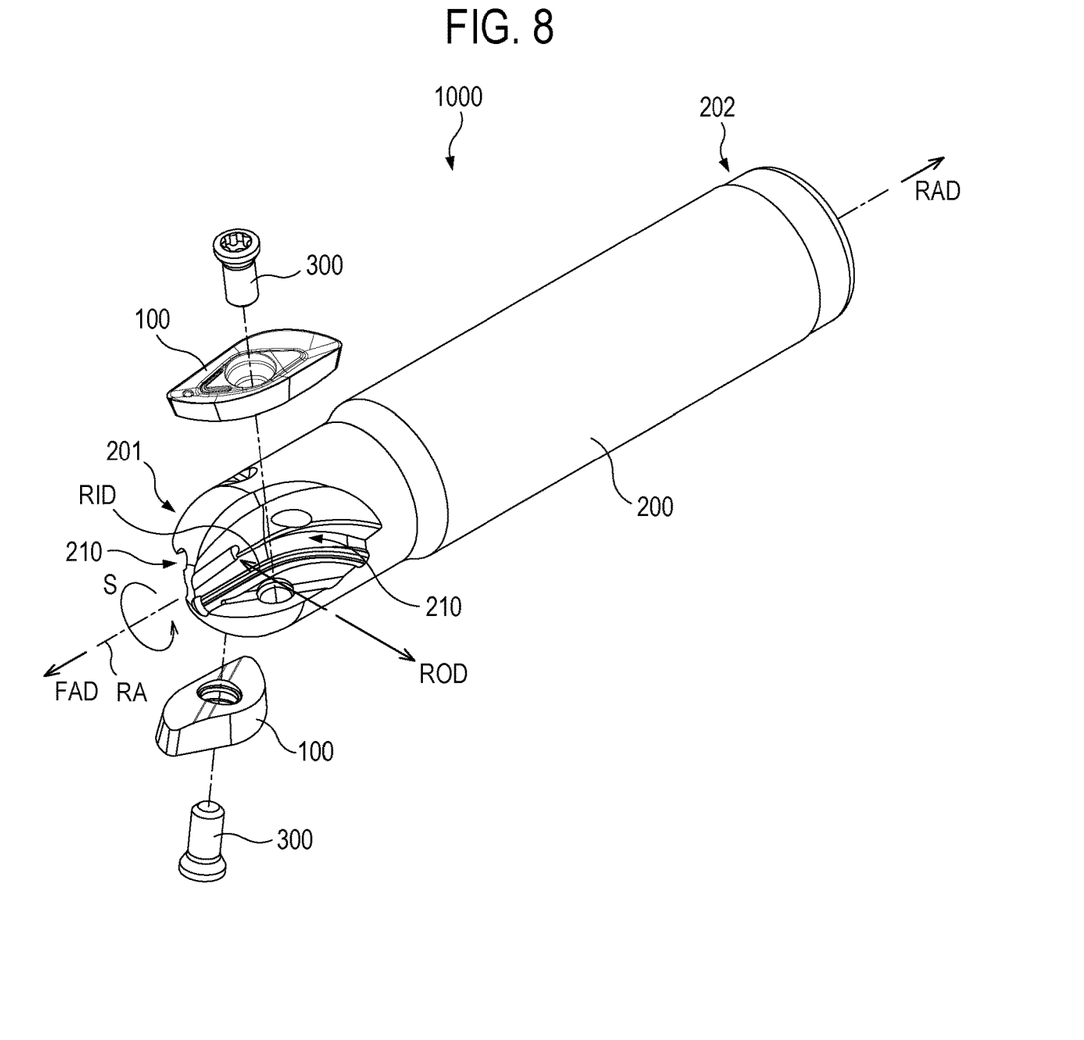
FIG. 8 is an exploded perspective view of the rotary cutting tool according to one embodiment of the present disclosure.

FIG. 7 is a perspective view showing the rotary cutting tool 1000 according to one embodiment of the present disclosure. FIG. 8 is an exploded perspective view of the rotary cutting tool 1000 shown in FIG. 7.

In FIG. 8, the rotary cutting tool 1000 has a rotation axis RA by which the rotation direction S is defined. The rotary cutting tool 1000 may be referred to as a milling cutter. On the rotation axis RA, the arrow FAD indicates the forward axial direction of the rotary cutting tool 1000, and the arrow RAD indicates the rearward axial direction of the rotary cutting tool 1000. Furthermore, in FIG. 8, the arrow ROD indicates the radially outward direction of the rotary cutting tool 1000, and the arrow RID indicates the radially inward direction of the rotary cutting tool 1000. In this regard, the radially inward direction RID of the rotary cutting tool 1000 indicates the direction going toward the rotation center of the rotary cutting tool 1000, and the radially outward direction ROD of the rotary cutting tool 1000 indicates the opposite direction of the radially inward direction RID.

Referring to FIGS. 7 and 8, the rotary cutting tool 1000 according to one embodiment includes a pair of cutting inserts 100, a tool body 200, and a pair of screws 300. The rotary cutting tool 1000 may be referred to as a ball nose end mill capable of machining a workpiece to have a curved surface. In particular, the rotary cutting tool 1000 may be referred to as an indexable ball nose end mill having two cutting edges.

The tool body (also referred to as a shank) 200 has a cylindrical shape. The pair of cutting inserts 100 is mounted on the longitudinal front end 201 of the tool body 200, and the tool body 200 is mounted on a milling machine at the longitudinal rear end 202 thereof.

Two rows of helical flutes 210 are formed at the front end 201 of the tool body 200 to facilitate chip discharging during the cutting of a workpiece. Pocket portions for accommodating the cutting inserts 100, i.e., a first insert pocket 220 and a second insert pocket 230, are formed in the two rows of helical flutes 210, respectively (see FIGS. 9 and 10). The cutting inserts 100 are mounted on the first insert pocket 220 and the second insert pocket 230 in different orientations, and are respectively fixed to the tool body 200 by the pair of screws 300.

The cutting inserts 100 are mounted on the tool body 200 so that the different cutting edges of the cutting inserts 100 are used for milling. For example, when milling a workpiece with the rotary cutting tool 1000 according to one embodiment, the cutting edge of one of the cutting inserts 100 may be used to cut the side surface of the workpiece, and the cutting edge of the other of the cutting inserts 100 may be used to cut the upper surface (a flat surface or a groove) of the workpiece.

Figure 9:
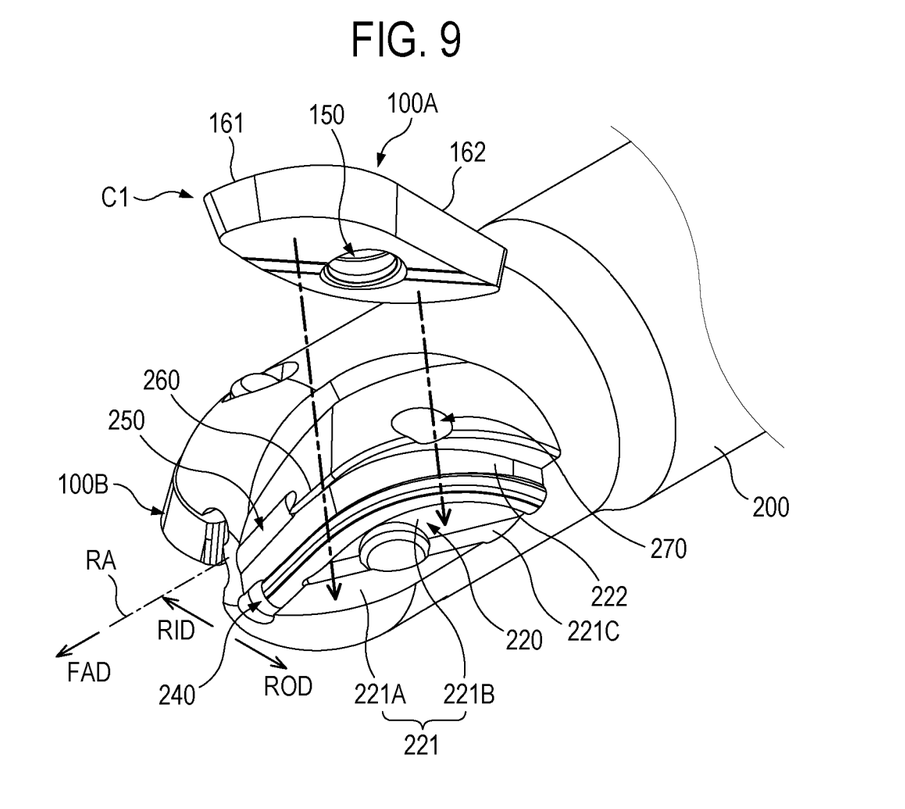
FIG. 9 is a view showing a first cutting insert separated from a tool body in the rotary cutting tool according to one embodiment of the present disclosure.
Figure 10:
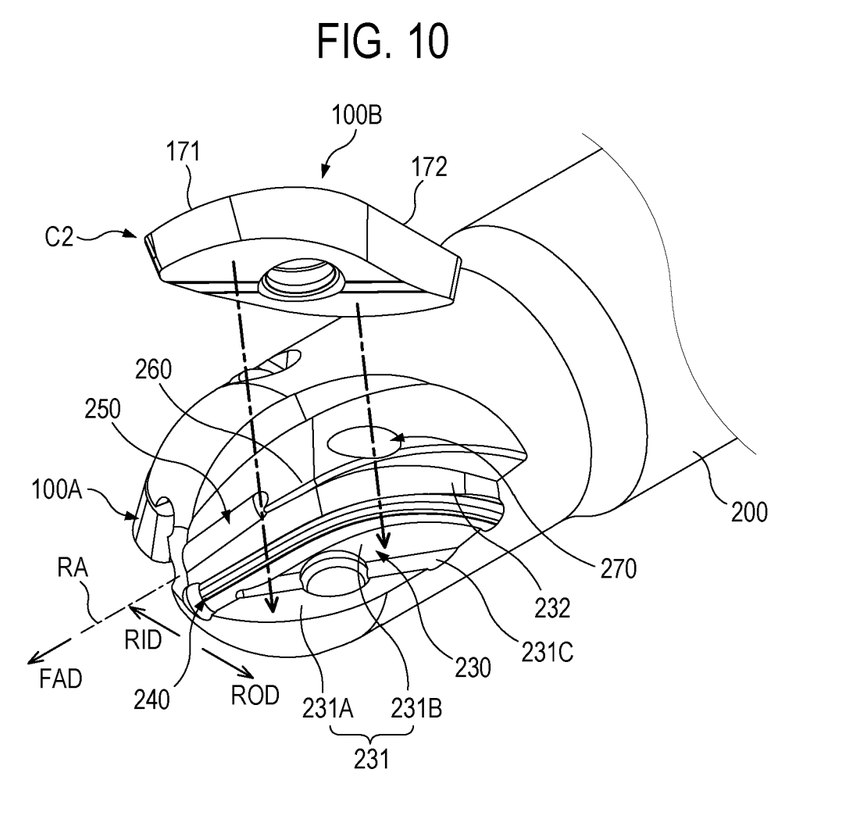
FIG. 10 is a view showing a second cutting insert separated from a tool body in the rotary cutting tool according to one embodiment of the present disclosure.
Figure 11:
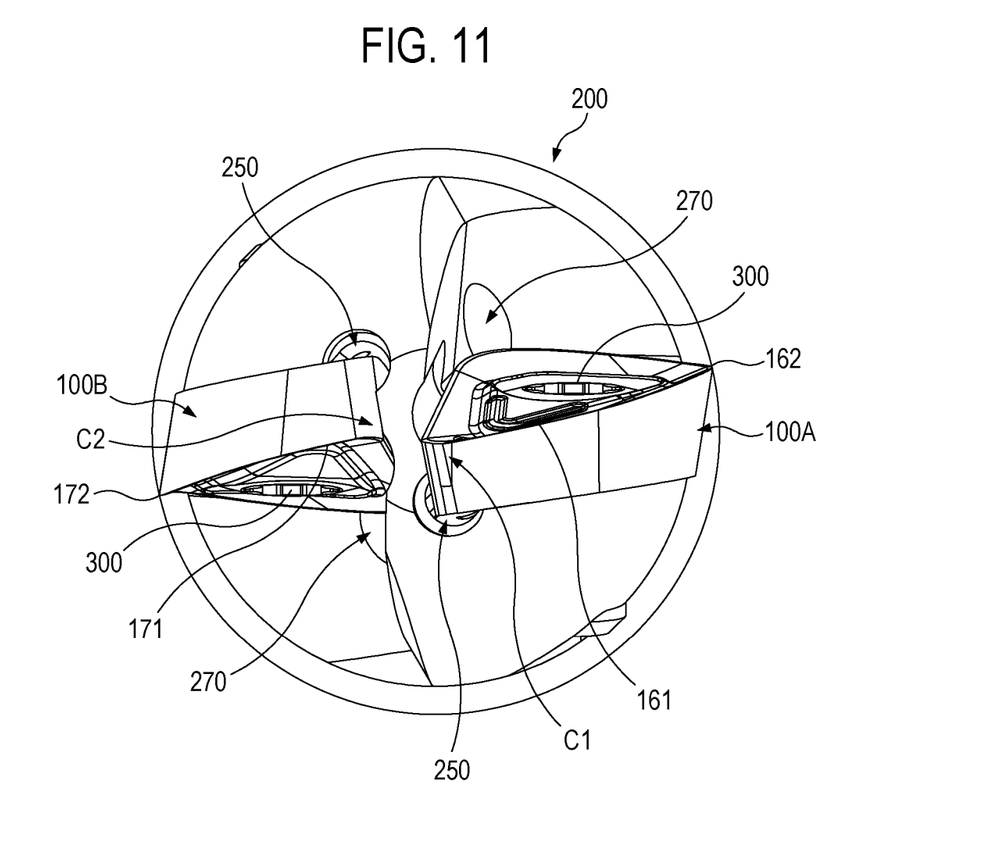
FIG. 11 is a view of the rotary cutting tool according to one embodiment of the present disclosure, which is viewed from a forward axial direction.

FIG. 9 is a view showing the first cutting insert 100A separated from the tool body 200 in the rotary cutting tool 1000 according to one embodiment of the present disclosure. FIG. 10 is a view illustrating the second cutting insert 100B separated from the tool body 200 in the rotary cutting tool 1000 according to one embodiment of the present disclosure. FIG. 11 is a view of the rotary cutting tool 1000 according to one embodiment of the present disclosure, which is viewed from the forward axial direction FAD.

Hereinafter, for the sake of convenience of description, the cutting insert 100 mounted on the first insert pocket 220 of the rotary cutting tool 1000 is referred to as a first cutting insert, and the cutting insert 100 mounted on the second insert pocket 230 of the rotary cutting tool 1000 is referred to as a second cutting insert.

Referring to FIGS. 9 to 11, the first cutting insert 100A is mounted on the first insert pocket 220 such that the first corner portion C1 is positioned in the forward axial direction FAD in which the front end of the tool body 200 is oriented and in a similar direction. Accordingly, the peripheral edge 161 of the first cutting insert 100A is positioned in the radially outward direction ROD and the forward axial direction FAD of the tool body 200 with respect to the center edge 171. Moreover, the second cutting insert 100B is mounted on the second insert pocket 230 such that the second corner portion C2 is positioned in the forward axial direction FAD and in a similar direction. Accordingly, the center edge 171 of the second cutting insert 100B is positioned in the radially outward direction ROD and the forward axial direction FAD of the tool body 200 with respect to the peripheral edge 161.

Since the first cutting edge 160 composed of the peripheral edge 161 and the long edge 162 and the second cutting edge 170 composed of the center edge 171 and the short edge 172 have different shapes from each other, the cutting edges of the first cutting insert 100A and the second cutting insert 100B contributing to the cutting are rotated to have different trajectories during the rotation of the tool body 200.

The lower surface 120 of the first cutting insert 100A has a V-shape when the first cutting insert 100A is viewed from a lateral side. The first insert pocket 220 has a first bottom surface 221 and a first side wall 222. When the first cutting insert 100A is seated on the first insert pocket 220, the first bottom surface 221 supports the V-shaped lower surface 120 of the first cutting insert 100A, and the first side wall 222 extending in the radially outward direction ROD of the tool body 200 from the inside of the first bottom surface 221 supports the second side surface 140 of the first cutting insert 100A. A fastening hole 223 is formed in the first bottom surface 221, and a screw 300 may be fastened to the fastening hole 223 in order to mount the first cutting insert 100A.

Similarly, the lower surface 120 of the second cutting insert 100B has a V-shape when the second cutting insert 100B is viewed from a lateral side. The second insert pocket 230 has a second bottom surface 231 and a second side wall 232. When the second cutting insert 100B is seated on the second insert pocket 230, the second bottom surface 231 supports the V-shaped lower surface 120 of the second cutting insert 100B, and the second side wall 232 extending in the radially outward direction ROD of the tool body 200 from the inside of the second bottom surface 231 supports the first side surface 130 of the second cutting insert 100B. A fastening hole 233 is formed in the second bottom surface 231, and a screw 300 may be fastened to the fastening hole 233 in order to mount the second cutting insert 100B.

The first bottom surface 221 of the first insert pocket 220 includes a first outer bottom surface 221A, a first inner bottom surface 221B and a first ridge receiving groove 221C. When the first cutting insert 100A is mounted on the first insert pocket 220, the first inclined surface 122 of the lower surface 120 adjacent to the peripheral edge 161 is brought into contact with and supported by the first outer bottom surface 221A, and the second inclined surface 123 of the lower surface 120 adjacent to the center edge 171 is brought into contact with and supported by the first inner bottom surface 221B. At this time, the ridge portion 121 of the lower surface 120 is located in the first ridge receiving groove 221C.

Furthermore, the second bottom surface 231 of the second insert pocket 230 includes a second outer bottom surface 231A, a second inner bottom surface 231B and a second ridge receiving groove 231C. When the second cutting insert 100B is mounted on the second insert pocket 230, the second inclined surface 123 of the lower surface 120 adjacent to the center edge 171 is brought into contact with and supported by the second outer bottom surface 223A, and the first inclined surface 122 of the lower surface 120 adjacent to the peripheral edge 161 is brought into contact with and supported by the second inner bottom surface 231B. At this time, the ridge portion 121 of the lower surface 120 is located in the second ridge receiving groove 231C.

A relief groove 240 is formed by end milling or drilling between the first bottom surface 221 and the first side wall 222 of the first insert pocket 220 and between the second bottom surface 231 and the second side wall 232 of the second insert pocket 230. The relief groove 240 prevents damage to the cutting edges of the first cutting insert 100A and the second cutting insert 100B, and ensures that the first cutting insert 100A and the second cutting insert 100B are accurately positioned in the corresponding insert pockets.

In addition, a concave groove 250 extending from the front end of the tool body 200 in the rearward axial direction RAD is formed in the portion of each of the first side wall 222 and the second side wall 232 of the tool body 200 in the radially outward direction ROD, so that the cutting insert 100 can be easily mounted on the corresponding insert pocket. When the upper surface 110 of the cutting insert 100 is viewed in a state in which the cutting insert 100 is mounted on the tool body 200, a portion 260 of the concave groove 250 in the rearward axial direction RAD may cover a portion of the inner edge of the upper surface 110. Accordingly, it is possible to structurally prevent chips generated during the milling of a workpiece from being introduced between the cutting insert 100 and the insert pocket.

As shown in FIGS. 9 and 10, the tool body 200 is provided with an opening 270 opened toward each of the first insert pocket 220 and the second insert pocket 230. In addition, a tool hole (not shown) extending in the longitudinal direction and connected to the opening 270 is provided inside the tool body 200. During the milling of a workpiece, the cutting oil supplied from the milling machine may be supplied through the tool hole and sprayed through the opening 270 to facilitate chip discharge.

Figure 12:
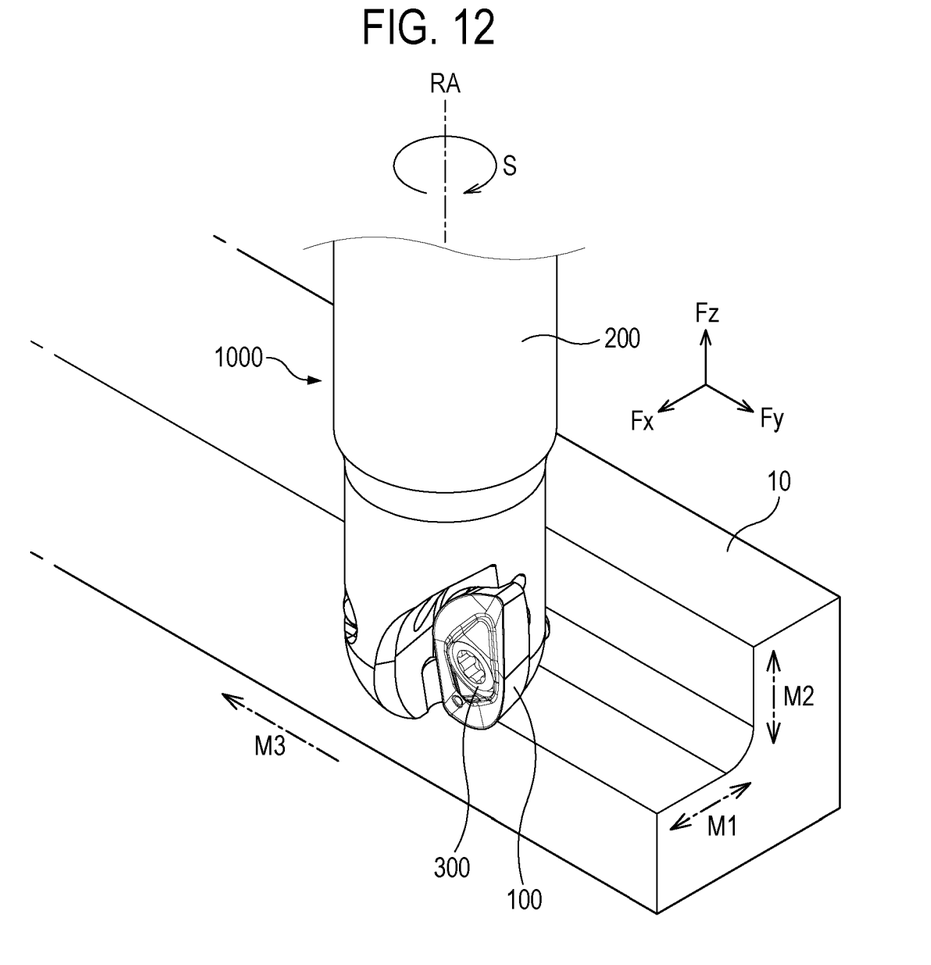
FIG. 12 is a view schematically showing a state in which a workpiece is milled by the rotary cutting tool according to one embodiment of the present disclosure.

FIG. 12 is a view schematically showing a state in which a workpiece 10 is milled by the rotary cutting tool 1000 according to one embodiment of the present disclosure.

As shown in FIG. 12, when the workpiece 10 is cut at a radial cut depth M1 and an axial cut depth M2 while feeding the rotating rotary cutting tool 1000 at a feed speed M3, the radial direction component force Fx, the feed direction component force Fy and the axial component force Fz act on the rotary cutting tool 1000. In the rotary cutting tool 1000 according to one embodiment, the lower surface 120 of the cutting insert 100 is formed in a V shape, and the insert pocket on which the cutting insert 100 is mounted has a corresponding bottom surface shape. Therefore, the rotary cutting tool 1000 can stably support the component force acting in three directions. That is, during milling, the radial component force Fx and the axial component force Fz can support the first outer bottom surface 221A and the first inner bottom surface 221B of the first insert pocket 220, and the second outer bottom surface 231A and the second inner bottom surface 231B of the second insert pocket 230. The feed direction component force Fy can support the first side wall 222 of the first insert pocket 220, the second side wall 232 of the second insert pocket 230 (see FIGS. 9 and 10).

In one embodiment, the first side wall 222 and the second side wall 232 include portions extending in a radially outward direction ROD of the tool body 200. As such, the first side wall 222 and the second side wall 232 may support a part of the axial component force Fz.

According to the above-described embodiments, due to the role of the protruding V-shaped bottom surface 120 of the cutting insert 100, the rotary cutting tool 1000 has stable fastening capability even in the three-dimensional cutting performed in the rotational direction, the radial direction and the axial direction. The lower surface 120 of the cutting insert 100 has the pair of inclined surfaces 122 and 123 formed in asymmetrical shapes. This makes it possible to prevent cross mounting of the cutting insert 100 (that is, it is possible to prevent the second cutting insert from being mounted on the first insert pocket, and to prevent the first cutting insert from being mounted on the second insert pocket). Moreover, the lower surface 120 of the cutting insert 100 is divided by the ridge portion 121 so that the pair of inclined surfaces 122 and 123 have as much a uniform pocket contact surface as possible. Accordingly, it is possible to expect a stable tool lifespan, which makes it possible to improve the productivity of the cutting process.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cutting insert, comprising:
    an upper surface;
    a lower surface opposite to the upper surface;
    a first side surface and a second side surface configured to connect the upper surface and the lower surface;
    a mounting hole formed to penetrate the upper surface and the lower surface, the mounting hole having a center (CP);
    a central axis (CL) passing through the center (CP) of the mounting hole and extending in an extension direction of the mounting hole;

a first cutting edge formed at an edge of the upper surface that meets the first side surface;

a second cutting edge formed at an edge of the upper surface that meets the second side surface; and a first corner portion and a second corner portion provided at both ends of the upper surface where the first side surface and the second side surface meet, wherein:

the lower surface includes a ridge portion, and a first inclined surface and a second inclined surface positioned on both sides of the ridge portion as a boundary, the cutting insert lacks 180° rotational symmetry about the central axis (CL), and when looking at the lower surface, the first inclined surface and the second inclined surface have asymmetric shapes with respect to the ridge portion.

2. The cutting insert of claim 1, wherein the first cutting edge includes a peripheral edge extending in a curved shape from the first corner portion and a long edge connected to the peripheral edge and extending to the second corner portion, the second cutting edge includes a center edge extending in a curved shape from the second corner portion and a short edge connected to the center edge and extending to the first corner portion, and a straight-line distance between both ends of the long edge is longer than a straight-line distance between both ends of the short edge.

3. The cutting insert of claim 2, wherein each of the long edge and the short edge has a straight line shape.

4. The cutting insert of claim 2, wherein when looking at the lower surface, the ridge portion is spaced apart from the second corner portion and is formed so as to be inclined with respect to a virtual line that connects a point where the peripheral edge and the long edge meet and the second corner portion, the ridge portion extending across the mounting hole.

5. The cutting insert of claim 2, wherein when looking at the lower surface, the ridge portion is formed to extend from an edge of the lower surface adjacent to the long edge to an edge of the lower surface adjacent to the short edge.

6. The cutting insert of claim 1, wherein the ridge portion is formed in a planar shape to have a set width between the first inclined surface and the second inclined surface.

7. The cutting insert of claim 1, wherein the ridge portion is formed in a shape of a line where the first inclined surface and the second inclined surface meet.

8. The cutting insert of claim 1, wherein each of the first inclined surface and the second inclined surface is formed to be inclined upward as a distance from the ridge portion increases.

9. The cutting insert of claim 8, wherein each of the first inclined surface and the second inclined surface is inclined at an inclination angle within a range of 5 degrees to 30 degrees with respect to a reference line perpendicular to a center axis line passing through a center of the mounting hole and extending in an extension direction of the mounting hole.

10. The cutting insert of claim 1, wherein the upper surface includes a center surface on which the mounting hole is formed, a land surface formed along the first cutting edge and the second cutting edge, and a rake surface formed between the center surface and the land surface, and when the cutting insert is viewed from a lateral side, each of the first corner portion and the second corner portion is raised more than the center surface.

11. A rotary cutting tool for milling a workpiece, comprising:

a cylindrical tool body having two rows of helical flutes formed at a longitudinal front end portion thereof;

a pair of cutting inserts replaceably mounted on the tool body; and a pair of screws configured to respectively fix the pair of cutting inserts to the tool body, wherein each of the pair of cutting inserts includes:

an upper surface;

a lower surface opposite to the upper surface and including a ridge portion, and a first inclined surface and a second inclined surface positioned on both sides of the ridge portion as a boundary and having asymmetric shapes with respect to the ridge portion;

a first side surface and a second side surface configured to connect the upper surface and the lower surface;

a mounting hole formed to penetrate the upper surface and the lower surface so that each of the pair of screws is fitted to the mounting hole, the mounting hole having a center (CP);

a central axis (CL) passing through the center (CP) of the mounting hole and extending in an extension direction of the mounting hole, wherein the cutting insert lacks 180° rotational symmetry about the central axis (CL);

a first corner portion and a second corner portion provided at both ends of the upper surface where the first side surface and the second side surface meet;

a first cutting edge formed between the first side surface and the upper surface and including a peripheral edge extending in a curved shape from the first corner portion; and a second cutting edge formed between the second side surface and the upper surface and including a center edge extending in a curved shape from the second corner portion, a first insert pocket and a second insert pocket for accommodating the pair of cutting inserts are formed in the two rows of helical flutes, respectively, the pair of cutting inserts includes a first cutting insert mounted on the first insert pocket such that the first corner portion is positioned in a forward axial direction in which a front end of the tool body is oriented, whereby the peripheral edge of the first cutting insert is positioned in a radially outward direction and the forward axial direction of the tool body with respect to the center edge, and the pair of cutting inserts includes a second cutting insert mounted on the second insert pocket such that the second corner portion is positioned in the forward axial direction, whereby the center edge of the second cutting insert is positioned in the radially outward direction and the forward axial direction of the tool body with respect to the peripheral edge.

12. The rotary cutting tool of claim 11, wherein the lower surface of the first cutting insert has a V-shape when the first cutting insert is viewed from a lateral side, the first insert pocket includes a first bottom surface configured to support the lower surface of the first cutting insert and a first side wall extending in the radially outward direction of the tool body from the inside of the first bottom surface and configured to support the second side surface of the first cutting insert, the lower surface of the second cutting insert has a V-shape when the second cutting insert is viewed from a lateral side, and the second insert pocket includes a second bottom surface configured to support the lower surface of the second cutting insert and a second side wall extending in the radially outward direction of the tool body from the inside of the second bottom surface and configured to support the first side surface of the second cutting insert.

13. The rotary cutting tool of claim 12, wherein the first bottom surface includes a first outer bottom surface making contact with the first inclined surface adjacent to the peripheral edge of the first cutting insert, a first inner bottom surface making contact with the second inclined surface adjacent to the center edge of the first cutting insert, and a first ridge receiving groove formed between the first outer bottom surface and the first inner bottom surface and configured to receive the ridge portion of the first cutting insert, and the second bottom surface includes a second inner bottom surface making contact with the first inclined surface adjacent to the peripheral edge of the second cutting insert, a second outer bottom surface making contact with the second inclined surface adjacent to the center edge of the second cutting insert, and a second ridge receiving groove formed between the second inner bottom surface and the second outer bottom surface and configured to receive the ridge portion of the second cutting insert.

14. The rotary cutting tool of claim 11, wherein the rotary cutting tool is a ball nose end mill.

15. The rotary cutting tool of claim 11, wherein the first and second inclined surfaces lack 180° rotational symmetry relative to one another, about the central axis (CL).

16. The rotary cutting tool of claim 11, wherein the first and second cutting edges lack 180° rotational symmetry relative to one another, about the central axis (CL).

17. The cutting insert of claim 1, wherein the first and second inclined surfaces lack 180° rotational symmetry relative to one another, about the central axis (CL).

18. The cutting insert of claim 1, wherein the first and second cutting edges lack 180° rotational symmetry relative to one another, about the central axis (CL).

19. A rotary cutting tool for milling a workpiece, comprising:
a cylindrical tool body having a rotation axis (RA) and first and second insert pockets formed at a longitudinal front end portion of the tool body;
first and second cutting inserts, each in the accordance with the cutting insert of claim 1, mounted in the first and second insert pockets, respectively; and
first and second screws securing respective first and second cutting inserts in respective first and second insert pockets;
wherein:
the first cutting insert is mounted such that its first corner portion is positioned in a forward axial direction at the front end of the tool body, with its peripheral edge positioned radially outward and axially forward of its center edge, and
the second cutting insert is mounted such that its second corner portion is positioned in the forward axial direction, with its center edge positioned radially outward and axially forward of its peripheral edge.

20. The rotary cutting tool of claim 19, wherein the first and second inclined surfaces lack 180° rotational symmetry relative to one another, about the central axis (CL).

* * * * *